US010444081B2

(12) United States Patent
Horng et al.

(10) Patent No.: US 10,444,081 B2
(45) Date of Patent: *Oct. 15, 2019

(54) THERMAL SENSOR

(71) Applicant: TAIWAN SEMICONDUCTOR MANUFACTURING COMPANY, LTD., Hsinchu (TW)

(72) Inventors: Jaw-Juinn Horng, Hsinchu (TW); Szu-Lin Liu, Hsinchu (TW); Chung-Hui Chen, Hsinchu (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/639,318

(22) Filed: Jun. 30, 2017

(65) Prior Publication Data
US 2017/0299442 A1    Oct. 19, 2017

Related U.S. Application Data

(63) Continuation of application No. 13/919,274, filed on Jun. 17, 2013, now Pat. No. 9,702,763.

(51) Int. Cl.
G01K 3/00 (2006.01)
G01K 3/04 (2006.01)
G01K 7/01 (2006.01)

(52) U.S. Cl.
CPC ............... G01K 3/04 (2013.01); G01K 7/01 (2013.01); Y10T 307/858 (2015.04)

(58) Field of Classification Search
CPC combination set(s) only.
See application file for complete search history.

(56) References Cited

U.S. PATENT DOCUMENTS

| 7,863,992 | B2 | 1/2011 | Chung |
| 8,618,848 | B1 | 12/2013 | Chee |
| 9,354,124 | B2 | 5/2016 | Horng et al. |
| 2003/0160641 | A1 | 8/2003 | Starr et al. |
| 2004/0227549 | A1 | 11/2004 | Solie |
| 2005/0001595 | A1 | 1/2005 | May et al. |
| 2005/0216220 | A1 | 9/2005 | Kim |

(Continued)

FOREIGN PATENT DOCUMENTS

| CN | 2677895 | 2/2005 |
| CN | 1731113 | 2/2006 |
| JP | 2010156621 | 7/2010 |

OTHER PUBLICATIONS

EPO English translation of CN1731113.*

(Continued)

Primary Examiner — Lisa M Caputo
Assistant Examiner — Nasir U. Ahmed
(74) Attorney, Agent, or Firm — Hauptman Ham, LLP

(57) ABSTRACT

A circuit includes a first current source that provides a current and a resistive branch in series with the first current source that provides a first voltage value and a second voltage value. A capacitive device is coupled with a voltage node having a voltage value, and a switching network alternates between charging the capacitive device to have the voltage value increase to the first voltage value, and discharging the capacitive device to have the voltage value decrease to the second voltage value.

20 Claims, 8 Drawing Sheets

(56) References Cited

U.S. PATENT DOCUMENTS

| | | |
|---|---|---|
| 2009/0045995 A1 | 2/2009 | Nozawa et al. |
| 2009/0085121 A1* | 4/2009 | Park ................. H01L 27/228 |
| | | 257/368 |
| 2010/0202184 A1 | 8/2010 | Lee |
| 2010/0208502 A1 | 8/2010 | Horii |
| 2011/0012082 A1 | 1/2011 | Tio Castro |
| 2012/0068641 A1 | 3/2012 | Imura |

OTHER PUBLICATIONS

Huang Hai et al., "Temperature compensation approach for monolithic reaxlation oscillator", International Elecronic Elements, vol. 1, Jan. 2006, pp. 32-34. English Abstract is on the first page.

Xiao Jinghe, "Applications of 555 Integrated Circuit (Integrated Circuit Applications Book Series)", China Archives of Publications CIP Data HZ(2007) No. 092517, ISBN 978-7-115-16349-3; 7 pages. English Abstract is on the first page.

* cited by examiner

US 10,444,081 B2

THERMAL SENSOR

PRIORITY CLAIM

The present application is a continuation of U.S. application Ser. No. 13/919,274, filed Jun. 17, 2013, which is incorporated herein by reference in its entirety.

FIELD

The present disclosure is related to a thermal sensor.

BACKGROUND

Many thermal sensors have deficiencies. For example, in an approach, a bipolar transistor (BJT) is used as part of a sensor. The BJT has a voltage Vbe drop across a base and an emitter of the BJT. By operation of the BJT, voltage Vbe varies as temperature varies. Further, the temperature coefficient of the sensor is not linear. As a result, temperature variations with respect to Vbe changes cannot be measured with high accuracy.

In another approach, two BJTs are used in two branches of the sensor. In some applications, additional circuitry is used in conjunction with the sensor. Exemplary additional circuitry includes a temperature independent current source and a "chop" circuitry. The chop circuitry is used to cancel noise and current mismatch. The additional circuitry adds complexity to the sensor.

BRIEF DESCRIPTION OF THE DRAWINGS

The details of one or more embodiments of the disclosure are set forth in the accompanying drawings and the description below. Other features and advantages will be apparent from the description, drawings, and claims.

Like reference symbols in the various drawings indicate like elements.

DETAILED DESCRIPTION

Figure 1:
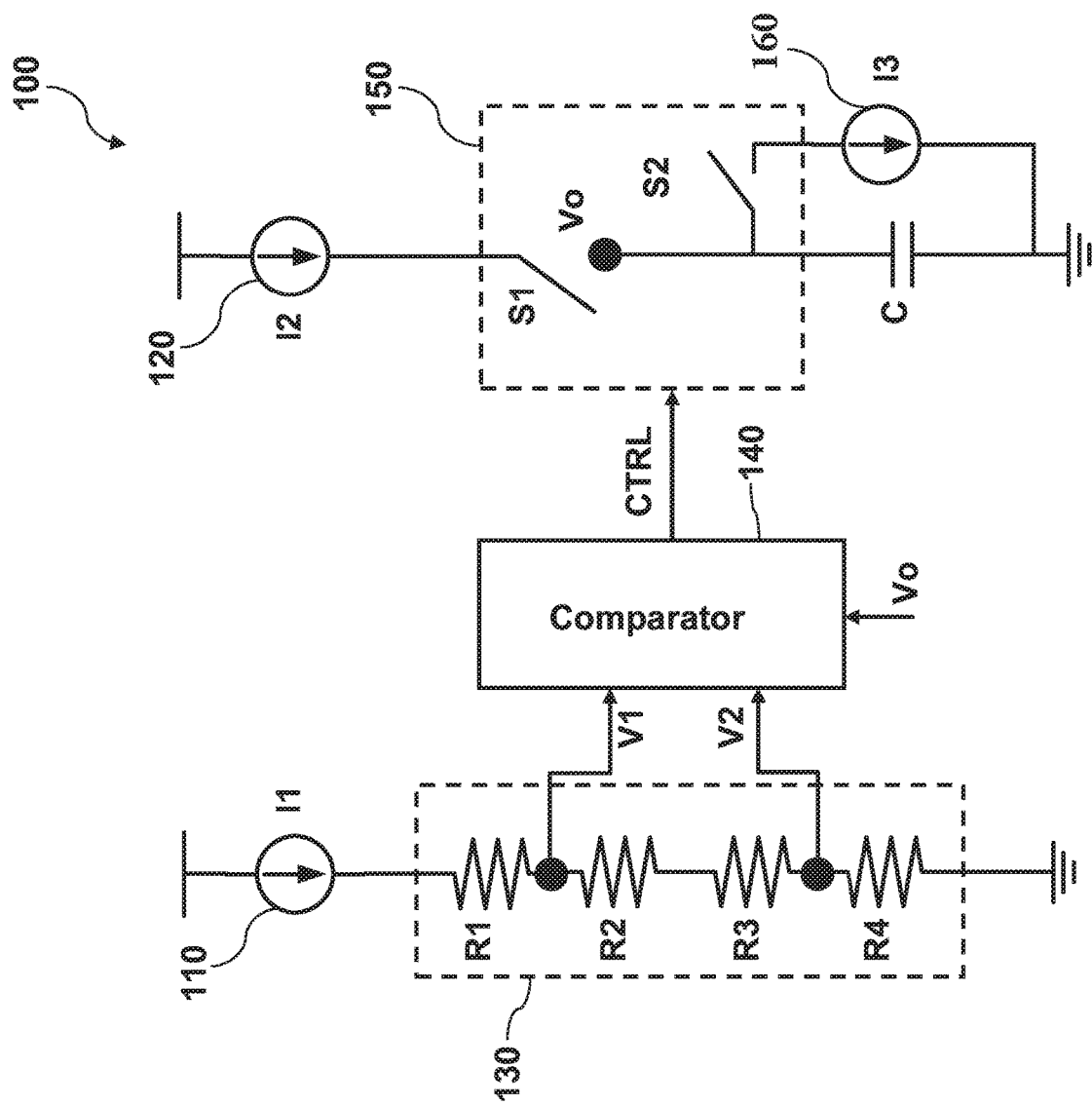
FIG. 1 is a diagram of a circuit for use in a thermal sensor, in accordance with some embodiments.

Embodiments, or examples, illustrated in the drawings are disclosed below using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art.

Some embodiments have one or a combination of the following features and/or advantages. In some embodiments, two voltages are generated based on resistive components and a single current. When the temperature on a device changes, for example, the changed temperature is measured based on the two voltages. Because the two voltages are generated based on a single current, temperature variation of the current on one voltage is canceled by temperature variation of the current on the other voltage. As a result, temperature measurements based on the two voltages provide increased accuracy. In some embodiments, temperature variations of various devices with respect to time are measured based on the two voltages.

Temperature Sensor

FIG. 1 is a diagram of a circuit 100, in accordance with some embodiments. In some embodiments, circuit 100 is used in a temperature sensor.

Voltages V1 and V2 are generated based on a current source 110 providing a current I1 flowing through a resistor branch 130. For illustration, resistor branch 130 includes four resistors R1, R2, R3, and R4 that are coupled in series. Resistors R1, R2, R3, and R4 function as a voltage divider. In some embodiments, each of resistors R1, R2, R3, and R4 has a same resistance value as that of another resistor. As a result, V1=3*V2. For illustration, a ratio of voltage V1 over voltage V2 is called RAT. In the example of FIG. 1, RAT=V1/V2=3.

Resistor branch 130 is used for illustration. Other resistance values for each of resistors R1, R2, R3, or R4 and/or other configurations of resistor branch 130 are within the contemplated scope of the present disclosure. In some embodiments, a relationship between voltage V1 and voltage V2 is first determined. A value for each of resistors R1, R2, R3, and R4 is then selected to satisfy the relationship between voltages V1 and V2. In some embodiments, the relationship between voltages V1 and V2 is expressed in term of ratio RAT. For illustration, the relationship between voltages V1 and V2 based on a value of ratio RAT, such as 3, is predetermined. Each value of each of resistors R1, R2, R3, and R4 is then selected to provide ratio RAT having the value 3. Different types of resistors used in resistor branch 130 are explained with reference to FIG. 3.

A comparator unit labeled as comparator 140 receives an input voltage V1, and input voltagV2, and an output voltage Vo to generate a control signal CTRL used to control a switching network 150 that includes switches S1 and S2. For example, in a charging mode, voltage Vo increases, and comparator 140 compares voltage V1 and voltage Vo. When voltage Vo reaches voltage V1, comparator 140 generates signal CTRL to open switch S1 and close switch S2 to turn into a discharging mode. In contrast, in a discharging mode, voltage Vo decreases, and comparator 140 compares voltage V2 and voltage Vo. When voltage Vo reaches voltage V2, comparator 140 generates signal CTRL to open switch S2 and close switch S1 to turn into the charging mode. Effectively, when switch S1 is closed and switch S2 is open, capacitor C is charged and voltage Vo increases. In some embodiments, comparator 140 provides a high logical value to control signal CTRL to open switch S1 and to close switch S2. In contrast, when switch S1 is open and switch S2 is closed, capacitor C is discharged, and voltage Vo decreases. In some embodiments, comparator 140 provides a low logical value to control signal CTRL to close switch S1 and to open switch S2. Other values of control signal CTRL to control switches S1 and S2 are within the contemplated scope of the present disclosure.

Switches S1 and S2 form switching network 150 and function for voltage Vo at an end of a capacitor C to charge and discharge capacitor C. Effectively, voltage Vo varies responsive to such charging and discharging of capacitor C. For example, in some embodiments, when switch S1 is closed and switch S2 is open, voltage Vo is charged by capacitor C and current I2 of a current source 120. In contrast, when switch S1 is open and switch S2 is closed, voltage Vo is discharged by capacitor C and a current I3 of a current source 160. Current I3 flows in parallel with capacitor C. In some embodiments, each of currents I1, I2, and I3 has a same value as that of the other currents. Configuration of switching network 150 is shown for illustration. Other configurations of switching network 150 to charge and discharge voltage Vo are within the contemplated scope of the present disclosure. In some embodiments, capacitor C has a capacitance value determined based on a timing characteristic of a circuit that uses circuit 100.

Wavforms

Figure 2:
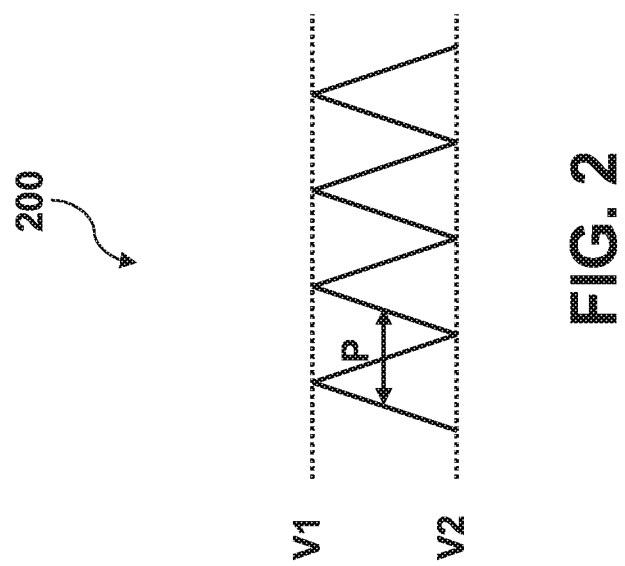
FIG. 2 is a graph of a waveform of the output voltage of the circuit in FIG. 1, in accordance with some embodiments.

FIG. 2 is a graph of a waveform 200 in accordance with some embodiments. Waveform 200 represents behavior of voltage Vo in FIG. 1 with reference to voltages V1 and V2 over time.

By operations of switches S1, S2, control signal CTRL, current I2, capacitor C and current I3, voltage Vo increases and decreases between voltage V1 and voltage V2 as shown in FIG. 2. For example, when voltage Vo is in a charging mode, voltage Vo increases. When voltage Vo reaches voltage V1, switch S1 is open and switch S2 is closed. As a result, voltage Vo changes to a discharging mode. Voltage Vo therefore decreases. When voltage Vo reaches voltage V2, switch S1 is closed and switch S2 is open. As a result, voltage Vo changes to the charging mode. Voltage Vo therefore increases. Over time, voltage Vo continues to increase in the charging mode and decrease in the discharging mode as illustrated by waveform 200.

Temperature Sensing

For illustration, P represents a time duration, a time period, or a time cycle of voltage Vo. In some embodiments, at a particular temperature T, time duration P has a particular value. As a result, when temperature T changes, time duration P changes to a corresponding value. For example, a temperature T1 corresponds to a time duration P1, and a temperature T2 corresponds to a time duration P2. When temperature changes from T1 to T2, the corresponding time duration changes from P1 to P2. In some embodiments, a plurality of time periods P corresponding to a plurality of temperatures T is obtained to generate a relationship between temperature T and time duration P. When a time duration P is known, a corresponding temperature T is determined based on the generated relationship. The relationship based on a plurality of time periods P corresponding to a plurality of temperatures T is called a multi-point calibration system.

In some embodiments, in a single point calibration having a pair of data points T1 and P1, when a time period P2, for example, is achieved based on waveform 200, a corresponding temperature T2 is determined based on a SPICE simulation. In other words, temperature T2 is sensed or measured. Explained in a different way, a variation of temperature from T1 to T2 is monitored and/or measured.

Features

For illustration, each of resistors R1, R2, R3, and R4 in FIG. 1 has a resistance value R. A voltage difference between voltage V1 and voltage V2 is called d(V1−V2). A change in voltage Vo is called d(Vo). A change in time corresponding to a first temperature T1 changing to a second temperature T2 is called dt. Effectively, dt is a change in time duration P1 to time duration P2. In some embodiments, d(V1−V2) is proportional to resistive values of resistors R1, R2, R3, and R4, which changes when temperature changes. In other words, a plurality of resistive values of each of resistors R1, R2, R3, and R4 is a function of temperature.

Mathematically expressed:

$$V1-V2=Vo \text{ or}$$

$$d(V1-V2)=d(Vo) \text{ or}$$

$$d(V1-V2)/dt=d(Vo)/dt$$

Further, $$V1=3R*I$$

$$V2=R*I$$

As a result, $$V1-V2=2R*I \text{ and}$$

$$d(2R*I)/dt=I/C \text{ or}$$

$$d(V1-V2)=d(Vo)=dt/C \quad (1)$$

Based on the above equation (1), a change in voltage Vo depends on a change of time and a capacitive value of capacitor C, without depending on the changes due to temperature of resistors R1, R2, R3, and R4 that are used in generating voltages V1 and V2. Explained in a different way, each of voltages V1 or V2 is dependent on a single current I1. As a result, variation of current I1 due to temperature on voltage V1 is canceled by variation of current I1 due to temperature on voltage V2. Further, in some embodiments, variation of voltage V1 due to power ripple is canceled by variation of voltage V2 due to power ripple.

Applications in FinFET

Figure 3:
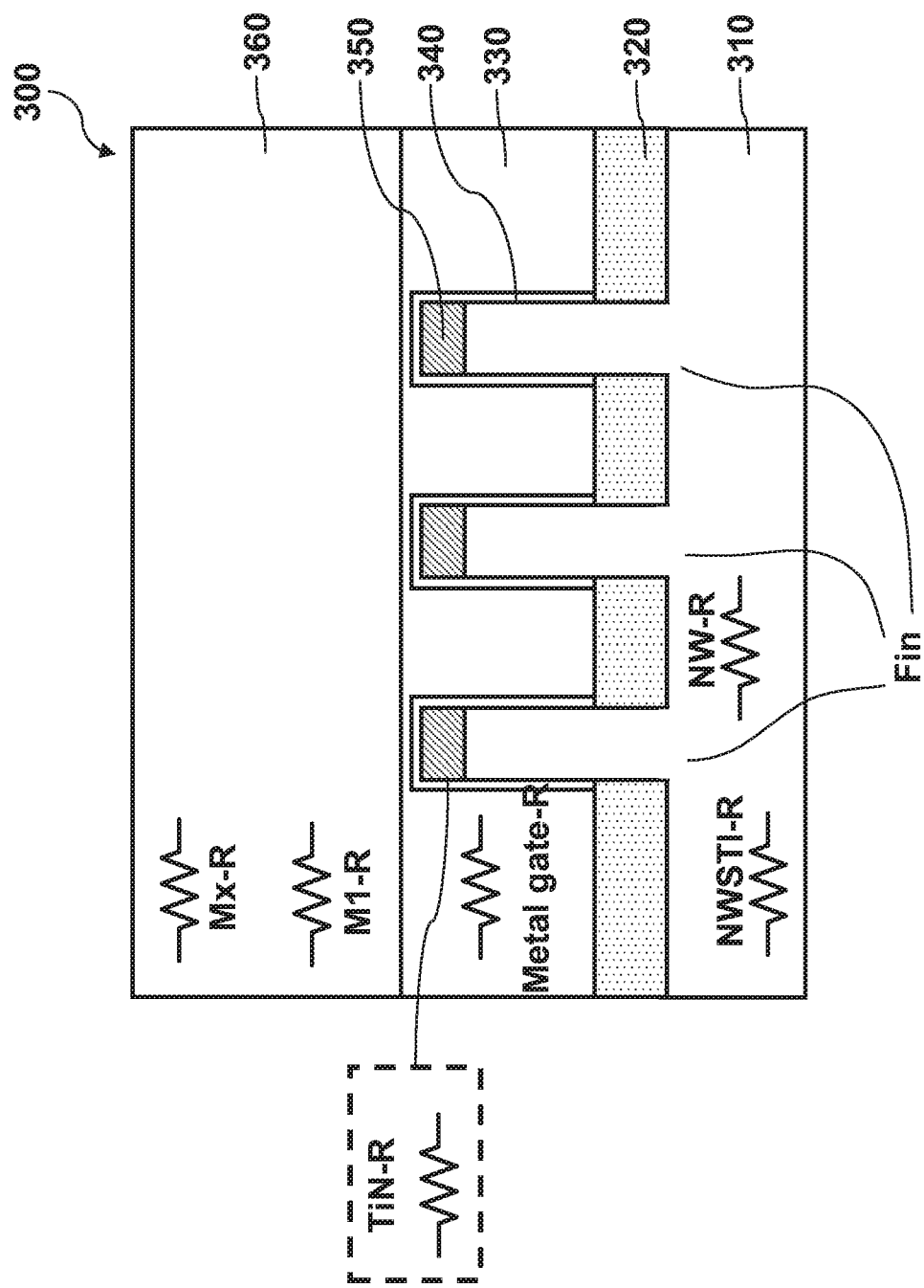
FIG. 3 is a cross-section diagram of a FinFET structure having a plurality of resistors for use in the circuit of claim 1, in accordance with some embodiments.

FIG. 3 is a cross-section view of a FinFET structure 300, in accordance with some embodiments. FinFET structure 300 includes different types of resistors that can be used in place of resistor R1, R2, R3, or R4 in circuit 100 of FIG. 1.

Structure 300 includes a plurality of layers. Each layer includes at least one type of resistors. For simplicity, one resistor of one type is shown in each layer. For example, a substrate 310 includes a first type resistor NWSTI-R and a second type resistor NW-R. For simplicity, one resistor NWSTI-R and one resistor NW-R are shown. Resistor NWSTI is formed between an N-well and a shallow trench isolation (STI). Resistor NW-R is formed in the N-well. For illustration, substrate 310 includes three fins. Substrate 310 having a different number of fins is within the contemplated scope of the present disclosure.

A shallow trench isolation layer 320 is over substrate 310.

A metal gate layer 330 is shown to include a metal gate resistor Metal gate-R.

A dielectric layer 340 includes dielectric resistors. In some embodiments, dielectric layer 340 includes Titanium Nitride (TiN). In some embodiments, resistors in dielectric layer are called resistors TiN-R. In the drawing, because dielectric layer 340 is too small to draw resistor TiN-R inside dielectric layer 340, a resistor TiN-R is shown outside of dielectric layer 340.

A silicon nitride (SiN) layer 350 is over the fins of substrate 310.

An interlayer dielectric layer (IDL) 360 includes a plurality of metal layer including metal layers M1 to Mx (not labeled), for example. Each metal layer includes a type of metal resistors. For example, metal layer M1 includes a plurality of metal resistors M1-R while metal layer Mx includes a plurality of metal resistors Mx-R.

In some embodiments, a diffusion area is on a diffusion layer that is called an OD layer. A layer used to couple diffusion areas and a contact in a metal layer, such as M0 layer, is called an MOOD layer (not shown). In some embodiments, MOOD layer includes resistors MOOD-R (not shown).

FinFET structure 300 is used for illustration. Other structures including corresponding resistors are within the contemplated scope of the present disclosure. For example, a planar semiconductor structure is within the contemplated scope of the present disclosure. For a further example, each layer of the planar structure includes a corresponding type of resistor.

Applications

Figure 4A:
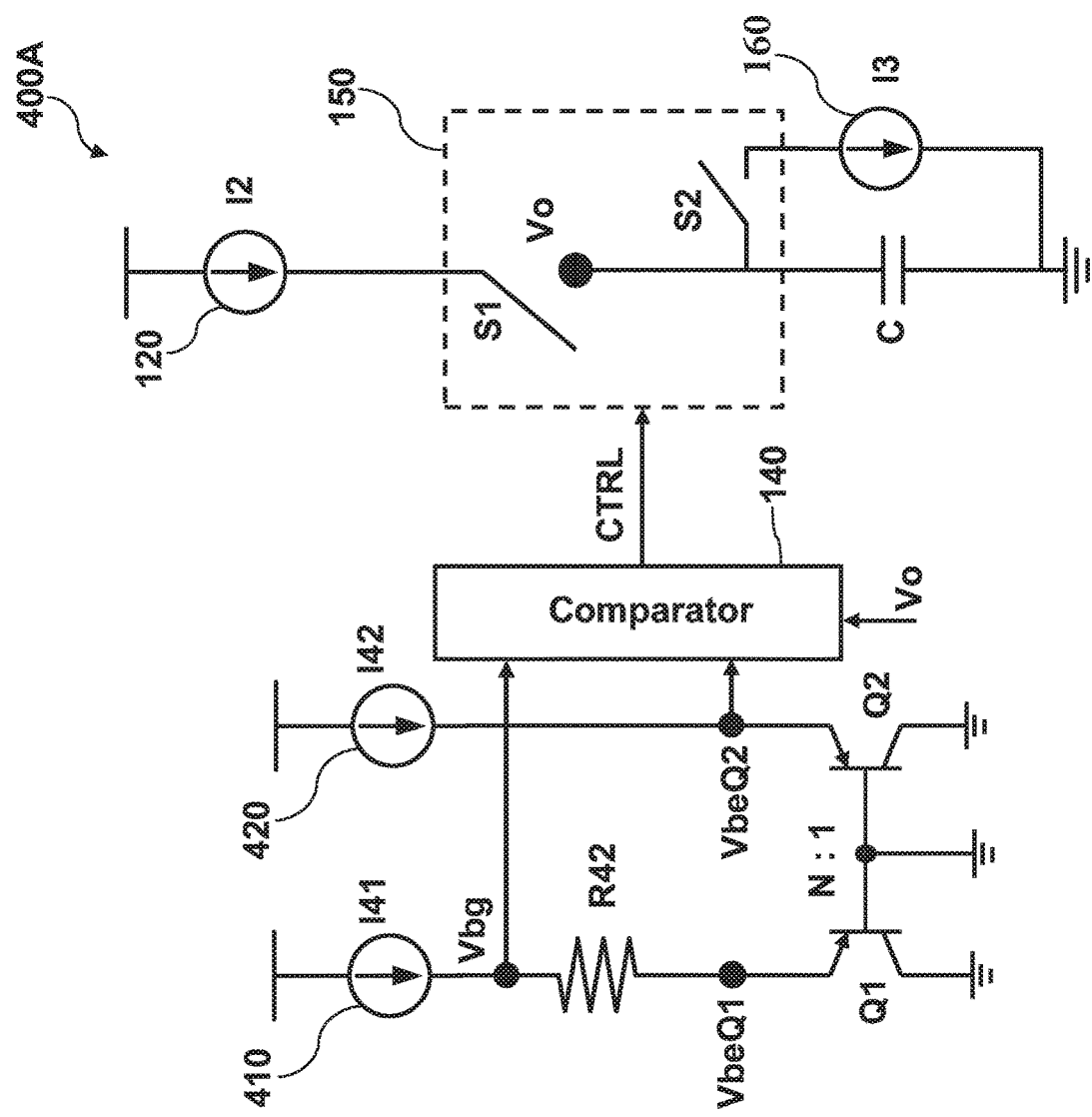
FIGS. 4A, 4B, 5A, and 5B are diagrams of other circuits for use in a thermal sensor, in accordance with some embodiments.

FIG. 4A is a diagram of a circuit 400A, in accordance with some embodiments. In some embodiments, circuit 400A is used in a temperature sensor in a manner similar to circuit 100.

For illustration, a voltage VbeQ1 is a voltage drop across a base and an emitter of a PNP BJT Q1. A voltage VbeQ2 is a voltage drop across a base and an emitter of a PNP BJT Q2. A voltage dVbe is a voltage difference between voltage VbeQ1 and VbeQ2.

Compared with circuit 100, in circuit 400A, a voltage Vbg corresponds to voltage V1 and voltage VbeQ2 corresponds to voltage V2 in FIG. 1. By characteristics of transistors Q1 and Q2, a value of each of voltages VbeQ1 and VbeQ2 varies depending on a size of corresponding transistors Q1 and Q2. As a result, voltage dVbe varies depending on sizes of transistors Q1 and Q2. In some embodiments, the size of transistor Q1 is N times the size of transistor Q2. The size relationship between transistors Q1 and Q2 is referred to as a ratio N:1. Other size relationships between transistors Q1 and transistor Q2 are within the contemplated scope of the present disclosure. A current source 410 provides a current I41 to generate voltage Vbg. A current source 420 provides a current I42 for transistor Q2.

Compared with circuit 100 in FIG. 1, R42 corresponds to 2R, and d(Vo) or d(Vbg−VbeQ2) corresponds to d(V1−V2).

Based on equation (1):

$$d(Vo)=d(Vbg-VbeQ2)=dt/C \qquad (11)$$

Based on equation (11), a change in voltage Vo depends on a change in time dt and a capacitive value of capacitor C, without depending on the changes in temperature of resistor R42, of currents I41 or current I42, of VbeQ1 or of VbeQ2.

Figure 4B:
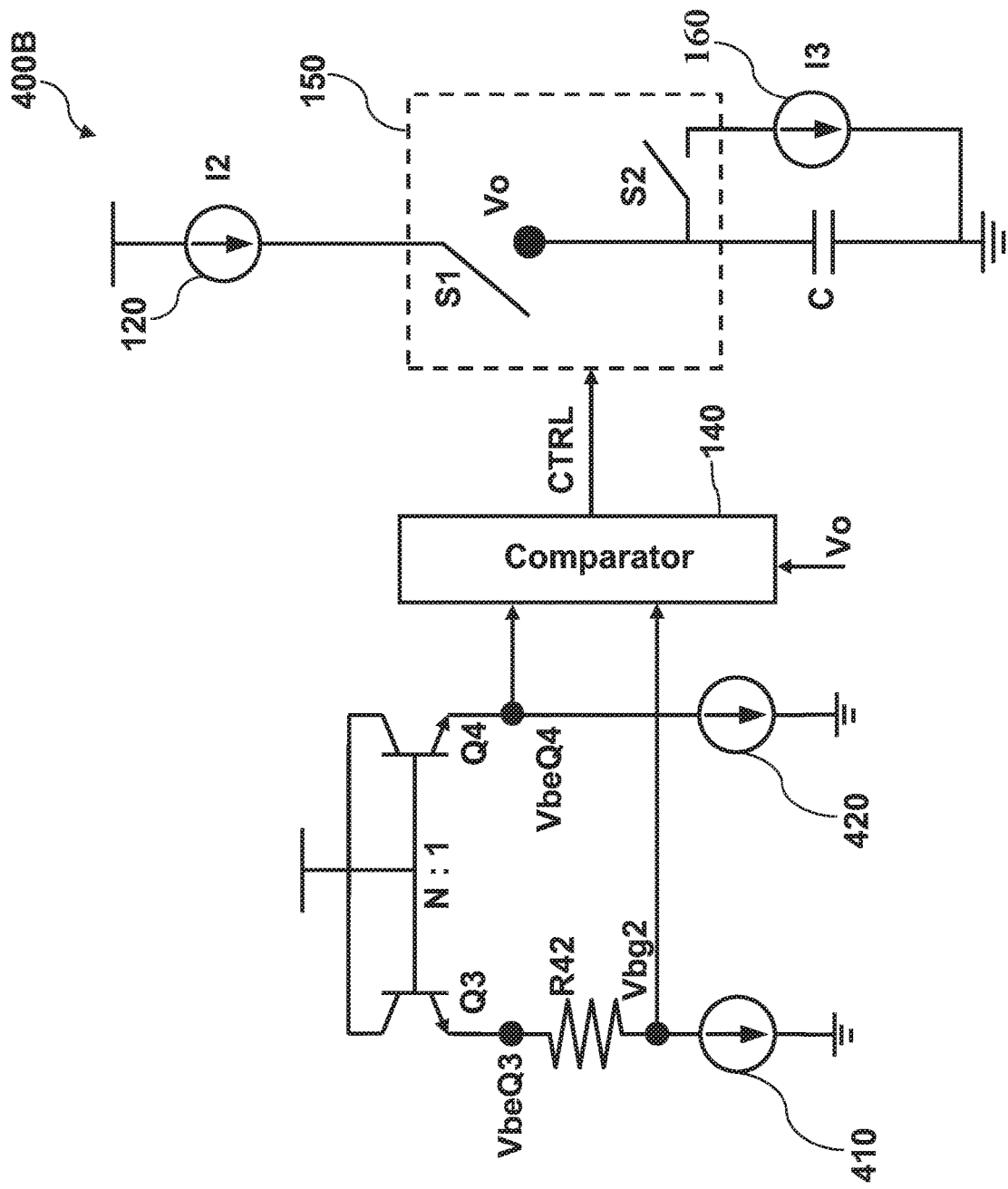

FIG. 4B is a diagram of a circuit 400B, in accordance with some embodiments. In some embodiments, circuit 400B is used in a temperature sensor in a manner similar to circuit 400A.

For illustration, a voltage drop across a base and an emitter of a transistor Q3 and a transistor Q4 is called VbeQ3 and VbeQ4, respectively. Compared with circuit 400A, in circuit 400B, NPN BJTs Q3 and Q4 replace PNP BJTs Q1 and Q2 in FIG. 4A, respectively. Voltage VbeQ4 corresponds to voltage VbeQ2. A voltage Vbg2 corresponds to voltage Vbg. A voltage difference between voltage VbeQ4 and Vbg2 is called dVbe2.

Based on equation (11):

$$d(Vo)=dVbe2=VbeQ4-Vbg2=dt/C \qquad (16)$$

Based on equation (16), a change in voltage Vo depends on a change in time dt and a capacitive value of capacitor C, without depending on the changes in temperature of resistor R42, of currents I41 or current I42, of VbeQ3 or of VbeQ4.

Figure 5A:
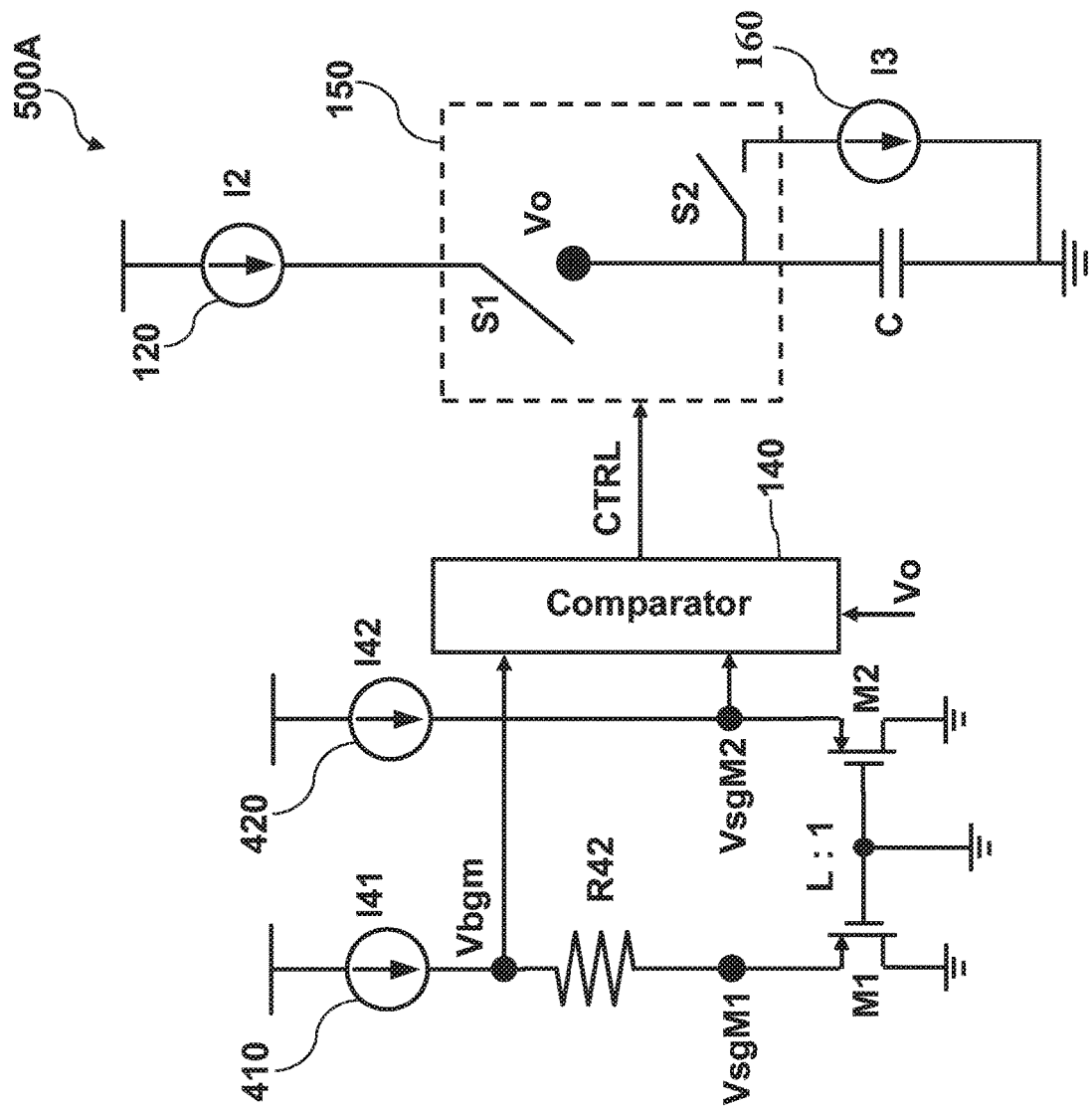

FIG. 5A is a diagram of a circuit 500A, in accordance with some embodiments. In some embodiments, circuit 500A is used in a temperature sensor in a manner similar to circuit 100.

For illustration, a voltage VsgM1 and a voltage VsgM2 are a voltage drop across a source and a gate of a PMOS transistor M1 and a PMOS transistor M2, respectively. Compared with circuit 400A, in circuit 500A, voltage VsgM2 corresponds to voltage VbeQ2 in FIG. 4A, and a voltage Vbgm corresponds to voltage Vbg.

A voltage dVsg is a voltage difference between voltages VsgM1 and VsgM2. By characteristics of transistors M1 and M2, a value of each of voltages VsgM1 and VsgM2 varies depending on a size of corresponding transistors M1 and M2. As a result, voltage dVsg varies depending on the sizes of transistors M1 and M2. In some embodiments, the size of transistor M1 is L times the size of transistor M2. The size relationship between transistors M1 and M2 is referred to as a ratio L:1.

Compared with circuit 400A in FIG. 4A, d(Vo) or d(Vbgm−Vsgm2) corresponds to d(Vbg−VbeQ2).

Based on equation (11):

$$d(Vo)=d(Vbgm-Vsgm2)=dt/C \qquad (21)$$

Based on equation (21), a change in voltage Vo depends on a change of time and a capacitive value of capacitor C, without depending on the changes in temperature of resistor R42, of currents I41 or current I42, or of Vsgm1 or Vsgm2.

Figure 5B:
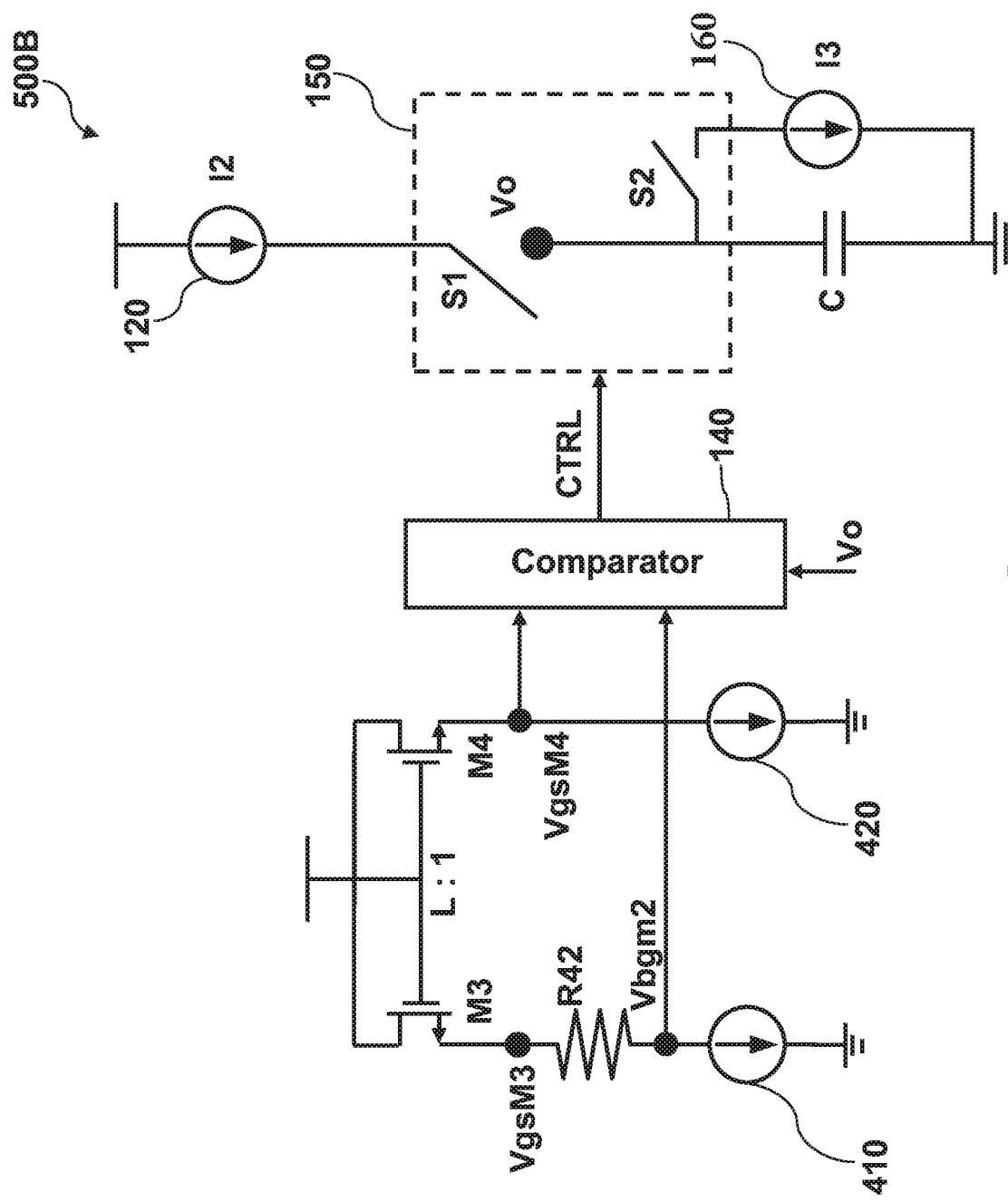

FIG. 5B is a diagram of a circuit 500B, in accordance with some embodiments. In some embodiments, circuit 500B is used in a temperature sensor in a manner similar to circuit 500A.

For illustration, a voltage drop across a gate and a source of a transistor M3 and a transistor M4 is called VgsM3 and VgsM4, respectively. Compared with circuit 500A, in circuit 500B, NMOS transistors M3 and M4 replace PMOS transistors M1 and M2 in FIG. 5A, respectively. Voltage VgsM4 corresponds to voltage Vbgm. A voltage Vbgm2 corresponds to voltage VgsM2. A voltage difference between voltage VgsM4 and Vbgm2 is called dVsg2.

Based on equation (11):

$$d(Vo)=dVsg2=VgsM4-Vbgm2=dt/C \qquad (26)$$

Based on equation (26), a change in voltage Vo depends on a change in time dt and a capacitive value of capacitor C, without depending on the changes in temperature of resistor R42, of currents I41 or current I42, of VgsM3 or of VgsM4.

Various embodiments related to circuit 100 are advantageous over other approaches that use MOS transistors. For example, the various embodiments are not subject to current variation that would otherwise be induced by current source mismatch in MOS transistors. The various embodiments do not have noise that would otherwise need to be canceled by a chop technique, for example, in other approaches. Further, in various embodiments of the present disclosure, a single resistor branch is used to generate voltages V1 and/or V2 to provide voltage Vo. Technique to obtain temperature in accordance with various embodiments of the present disclosure is therefore called resistive thermal sensing.

In some embodiments, circuit 100 is used in a planar or a FinFET semiconductor structure. In other words, techniques of the present disclosure are compatible with both the planar and FinFET processes. For example, in some embodiments, circuit 100 is built by a FinFET process. A current source, such as current source 110, is implemented by a transistor. Based on the FinFET technology, an impedance of the transistor used as current source 110 increases, compared with an impedance when the transistor is built by another technology. As a result, a gain-bandwidth of comparator 140 also increases. In some embodiments, circuits 400A, 400B, 500A, and/or 500B are fabricated using a FinFET process and thus have similar advantages as circuit 100.

As each layer of a semiconductor structure includes different types of resistors, techniques in various embodiments of the present disclosure are therefore are applicable to monitoring temperature variations in different layers and thus different depths of a semiconductor structure. Further, voltages V1 and V2 are generated in a same resistor branch 130. As a result, variation in temperature of one voltage is canceled by variation in temperature of another voltage. In contrast, in other approaches, two voltages comparable to voltages V1 and V2 are generated in two different branches. Current mismatch could occur in different branches in those approaches. As a result, in those approaches, variation in temperature of one voltage is not canceled by variation in temperature of the other voltage. Further, in other approaches that are BJT based, BJTs are formed in the substrate and not formed in other layers. As a result, sensing techniques in those approaches are applicable only in the substrate, but not in other layers of the semiconductor structure. In some embodiments, circuit 100 is usable to detect temperature variations at a layer within the substrate and/or multiple interconnection layers, which is also known as back end of line (BEOL) layers. In some embodiments, circuits 400A, 400B, 500A, and 500B are usable to detect temperature variations at a layer within the substrate.

As shown in FIG. 1, circuit 100 uses a single resistor branch. As a result, 1/f noise in operation voltage VDD is canceled, and circuitry and die area for a chop technique to cancel 1/f noise are avoided.

Further, various embodiments of the present disclosure are advantageous over other approaches that use BJT. For example, operation voltage VDD of the various embodiments is not limited by the forward-junction of the BJT. As a result, values of operation voltage VDD of the various embodiments are lower than 0.7 V. In contrast, in approaches that use BJT, operation voltage VDD of related circuits is limited by the forward-junction of the BJT, and cannot be lower than 0.7 V. In contrast, in some embodiments, circuits 100, 500A, and 500B do not have this forward junction bias limitation.

In some embodiments, time periods P of voltage Vo in FIG. 2 at different corresponding temperatures T are obtained to generate a relationship between time periods P and temperatures T. As a result, given a time period, such as time period Pi, a corresponding temperature T1, for example, is determined based on the relationship.

Method

Figure 6:
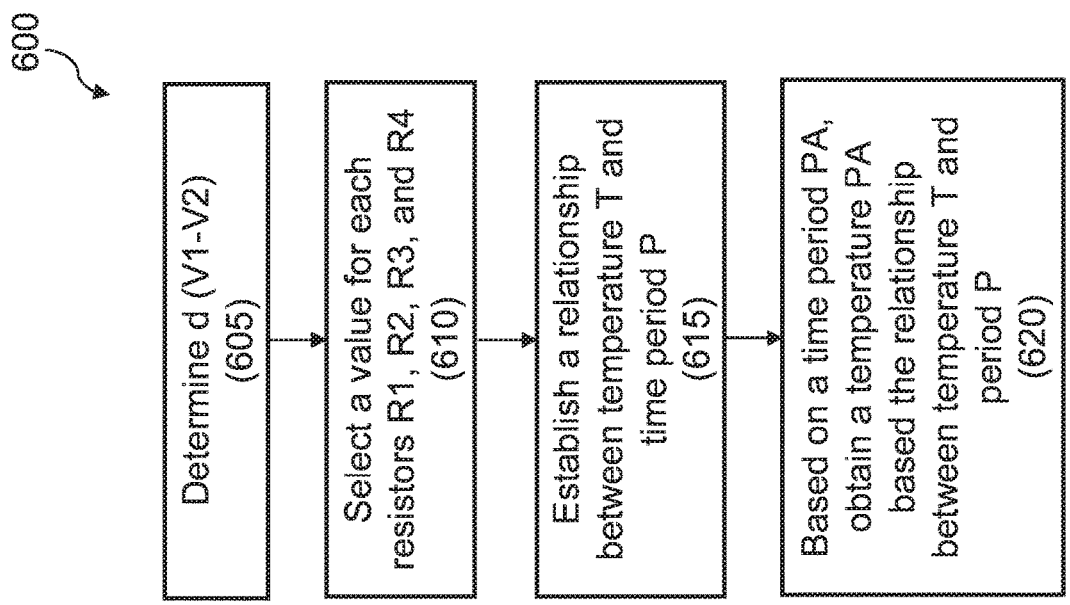
FIG. 6 is a flowchart of a method of operating the circuit in FIG. 1 in accordance with some embodiments.

FIG. 6 is a flowchart of a method 600, in accordance with some embodiments. Method 600 illustrates operation of circuit 100 in FIG. 1.

In operation 605, a voltage difference d(V1−V2) between voltages V1 and V2 is determined. In some embodiments, the voltage difference d(V1−V2) is expressed by ratio RAT. For example, ratio RAT with a predetermined number of 3 is selected. In other words, a value of voltage V1 is three times a value of voltage V2. Different relationships between voltages V1 and V2 are within the contemplated scope of the present disclosure.

In operation 610, a value of each of resistors R1, R2, R3, and R4 is determined to provide voltages V1 and V2 based on the difference d(V1−V2) and/or ratio RAT. For illustration, each of resistors R1, R2, R3, and R4 is selected to have an equal resistive value R to satisfy the illustrated ratio RAT to be 3.

In operation 615, a plurality of voltages Vo is obtained at a plurality of temperatures T. In other words, a plurality of data points for voltage Vo and temperature T is obtained. At a particular data point corresponding to a temperature T, voltage Vo behaves as explained by waveform 200 in FIG. 2. Voltage Vo also has a corresponding time period P. Based on the plurality of data points of temperature T and corresponding time period P, a relationship between temperature T and period P is established. For illustration, the relationship is called relationship REL. In some embodiments, establishing relationship REL based on a plurality data point is called a multi-point calibration. In contrast, if one data point corresponding to one temperature and one time period is used to determine relationship REL, obtaining relationship REL is called a one-point calibration.

In operation 620, when circuit 100 is used in a particular application, voltage Vo is obtained having an application period PA, for example. Based on application period PA and relationship REL, a corresponding temperature TA, for example, is obtained. In other words, temperature TA has been sensed. Alternatively, based on temperature TA and relationship REL, corresponding PA is obtained.

In some embodiments, circuit 100 operates at a known temperature, such as room temperature, which, for illustration, is 25° C. Circuit 100 thus provides a known time period P at 25° C. When temperature in the room changes, time period P changes. Based on the changed period P and relationship REL, the changed temperature in the room is determined or sensed. Explained in a different way, circuit 100 is used to monitor or sense the temperature change or temperature variation. In some embodiments, in a one point calibration system, sensing a temperature variation is obtained from the changed period P and a SPICE simulation.

FIG. 6 using circuit 100 is for illustration. With respect to circuit 400A in FIG. 4A, operations 615 and 620 are similar in which voltages Vbg and VbeQ2 replace corresponding voltages V1 and V2 in FIG. 1. Likewise, with respect to circuit 400B in FIG. 4B, operations 615 and 620 are similar in which voltages VbeQ4 and Vbg2 replace corresponding voltages V1 and V2. With respect to circuit 500A in FIG. 5A, operations 615 and 620 are similar in which voltages Vbgm and VsgM2 replace corresponding voltages V1 and V2. With respect to circuit 500B in FIG. 5B, operations 615 and 620 are similar in which voltages VgsM4 and VBgm2 replace corresponding voltages V1 and V2.

In some embodiments, a circuit includes a first current source configured to provide a current, a resistive branch in series with the first current source and configured to provide a first voltage value and a second voltage value, a capacitive device coupled with a voltage node having a voltage value, and a switching network configured to alternate between charging the capacitive device to have the voltage value increase to the first voltage value, and discharging the capacitive device to have the voltage value decrease to the second voltage value.

In some embodiments, a method includes providing, by a resistor branch of a sensor circuit, a first voltage value and a second voltage value, switching a voltage of a voltage node of the sensor circuit between the first voltage value and the second voltage value to acquire a time period of the voltage, establishing a relationship between the time period of the voltage and temperature, and based on the relationship, determining a temperature corresponding to the time period.

In some embodiments, a circuit includes a first current source in series with a plurality of resistors, wherein the first current source and the plurality of resistors are coupled between an operation voltage and a reference voltage, the plurality of resistors is configured to have a first voltage value between a first two resistors of the plurality of resistors, and the plurality of resistors is configured to have a second voltage value between a second two resistors of the plurality of resistors. The circuit also includes a capacitive device coupled between the reference voltage and a voltage node having a voltage value, a second current source in series with a first switch, the second current source and the first switch being coupled between the operation voltage and the voltage node, and a third current source in series with a second switch, the third current source and the second switch being coupled between the voltage node and the reference voltage. The second current source and the first switch are configured to charge the voltage node to the first voltage value in response to the voltage value reaching the second voltage value, and the third current source and the second switch are configured to discharge the voltage node to the second voltage value in response to the voltage value reaching the first voltage value.

A number of embodiments have been described. It will nevertheless be understood that various modifications may be made without departing from the spirit and scope of the disclosure. For example, various transistors being shown as a particular dopant type (e.g., N-type or P-type Metal Oxide Semiconductor (NMOS or PMOS)) are for illustration purposes. Embodiments of the disclosure are not limited to a particular type. Selecting different dopant types for a particular transistor is within the scope of various embodiments. A low or high logical value of various signals used in the above description is also for illustration. Various embodiments are not limited to a particular logical value when a signal is activated and/or deactivated. Selecting different logical values is within the scope of various embodiments. In various embodiments, a transistor functions as a switch. A switching circuit used in place of a transistor is within the scope of various embodiments. In various embodiments, a source of a transistor can be configured as a drain, and a drain can be configured as a source.

Various figures show discrete resistors and capacitors for illustration. Equivalent circuitry may be used. For example, a resistive device, circuitry or network (e.g., a combination of resistors, resistive devices, circuitry, etc.) can be used in place of a resistor. Similarly, a capacitive device, circuitry or network (e.g., a combination of capacitors, capacitive devices, circuitry, etc.) can be used in place of a capacitor.

The above illustrations include exemplary steps, but the steps are not necessarily performed in the order shown. Steps may be added, replaced, changed order, and/or eliminated as appropriate, in accordance with the spirit and scope of disclosed embodiments.

What is claimed is:

1. A circuit comprising:
a first current source configured to provide a current;
a resistive branch in series with the first current source and configured to
receive the current from the first current source at an input,
provide a first voltage value at a first output separate from the input, and
provide a second voltage value at a second output separate from the input;
a capacitive device coupled with a voltage node having a voltage value; and
a switching network configured to alternate between charging the capacitive device to have the voltage value increase to the first voltage value, and discharging the capacitive device to have the voltage value decrease to the second voltage value.

2. The circuit of claim 1, wherein the first current source comprises a FinFET transistor.

3. The circuit of claim 1, wherein the resistive branch comprises a resistive device that is part of a transistor.

4. The circuit of claim 3, wherein the resistive device comprises at least one of a well-based resistor, a dielectric resistor, a contact-based resistor, or a metal resistor.

5. The circuit of claim 3, wherein the transistor is a FinFET transistor.

6. The circuit of claim 1, wherein the resistive branch comprises a series of resistors configured to provide the first voltage value and the second voltage value based on a predetermined ratio.

7. The circuit of claim 1, wherein
the circuit comprises a comparator circuit configured to generate a control signal based on a comparison of the voltage value to the first voltage value and to the second voltage value, and
the switching network is configured to alternate between charging the capacitive device and discharging the capacitive device responsive to the control signal.

8. The circuit of claim 1, wherein
the circuit comprises a second current source and a third current source, and
the switching network comprises:
a first switch configured to charge the capacitive device with the second current source; and
a second switch configured to discharge the capacitive device with the third current source.

9. A method comprising:
receiving a current at an input of a resistor branch of a sensor circuit, the resistor branch comprising a resistor;
based on the current, providing a first voltage value at a first output of the resistor branch separate from the input and a second voltage value at a second output of the resistor branch separate from the input;
switching a voltage of a voltage node of the sensor circuit between the first voltage value and the second voltage value to acquire a time period of the voltage;
establishing a relationship between the time period of the voltage and temperature; and
based on the relationship, determining a temperature of the resistor corresponding to the time period.

10. The method of claim 9, wherein the providing the first voltage value and the second voltage value comprises causing the current to flow in the resistor, the resistor being part of a transistor.

11. The method of claim 10, wherein the causing the current to flow in the resistor comprises causing the current to flow in at least one of a well-based resistor, a dielectric resistor, a contact-based resistor, or a metal resistor.

12. The method of claim 9, wherein the providing the first voltage value and the second voltage value comprises providing the first voltage value and the second voltage value according to a predetermined ratio.

13. The method of claim 9, wherein the switching the voltage of the voltage node of the sensor circuit between the first voltage value and the second voltage value comprises:
  charging a capacitive device coupled to the voltage node to the first voltage value in response to the voltage of the voltage node reaching the second voltage value; and
  discharging the capacitive device to the second voltage value in response to the voltage of the voltage node reaching the first voltage value.

14. The method of claim 9, wherein at least one of the establishing the relationship between the time period of the voltage and temperature or the determining the temperature corresponding to the time period is based on a plurality of time periods corresponding to a plurality of known temperatures.

15. The method of claim 9, wherein at least one of the establishing the relationship between the time period of the voltage and temperature or the determining the temperature corresponding to the time period is based on a single time period for a single known temperature and a simulation.

16. A circuit comprising:
  a first current source in series with a plurality of resistors, wherein
    the first current source and the plurality of resistors are coupled between an operation voltage and a reference voltage,
    the plurality of resistors is configured to have a first voltage value between a first two resistors of the plurality of resistors, and
    the plurality of resistors is configured to have a second voltage value between a second two resistors of the plurality of resistors;
  a capacitive device coupled between the reference voltage and a voltage node having a voltage value;
  a second current source in series with a first switch, the second current source and the first switch being coupled between the operation voltage and the voltage node; and
  a third current source in series with a second switch, the third current source and the second switch being coupled between the voltage node and the reference voltage,
  wherein,
    the second current source and the first switch are configured to charge the voltage node to the first voltage value in response to the voltage value reaching the second voltage value, and
    the third current source and the second switch are configured to discharge the voltage node to the second voltage value in response to the voltage value reaching the first voltage value.

17. The circuit of claim 16, wherein at least one of the first current source, the second current source, or the third current source comprises a FinFET structure.

18. The circuit of claim 16, wherein a corresponding plurality of resistive values of the plurality of resistors determines a ratio of the first voltage value to the second voltage value.

19. The circuit of claim 16, wherein at least one resistor of the plurality of resistors is a well-based resistor, a dielectric resistor, a contact-based resistor, or a metal resistor of a semiconductor structure.

20. The circuit of claim 19, wherein the first two resistors of the plurality of resistors are separate from the second two resistors of the plurality of resistors.

\* \* \* \* \*